United States Patent
Lopes et al.

(10) Patent No.: US 10,363,444 B2
(45) Date of Patent: Jul. 30, 2019

(54) SELF-ADJUSTING FIRESTOPPING SLEEVE APPARATUS

(71) Applicant: Specified Technologies Inc., Somerville, NJ (US)

(72) Inventors: Julio Lopes, Dunellen, NJ (US); Joel Mermoud, Secaucus, NJ (US)

(73) Assignee: Specified Technologies Inc., Somerville, NJ (US)

( * ) Notice: Subject to any disclaimer, the term of this patent is extended or adjusted under 35 U.S.C. 154(b) by 0 days.

(21) Appl. No.: 15/764,293

(22) PCT Filed: Sep. 30, 2016

(86) PCT No.: PCT/US2016/054616
§ 371 (c)(1),
(2) Date: Mar. 28, 2018

(87) PCT Pub. No.: WO2017/059176
PCT Pub. Date: Apr. 6, 2017

(65) Prior Publication Data
US 2018/0264298 A1    Sep. 20, 2018

Related U.S. Application Data

(60) Provisional application No. 62/234,978, filed on Sep. 30, 2015.

(51) Int. Cl.
*F16L 5/04*      (2006.01)
*A62C 2/06*      (2006.01)
(Continued)

(52) U.S. Cl.
CPC .............. *A62C 2/065* (2013.01); *A62C 3/16* (2013.01); *E04B 1/94* (2013.01); *F16L 5/04* (2013.01)

(58) Field of Classification Search
CPC ... A62C 3/16; E06B 1/94; E06B 1/948; F16L 5/04; F16L 5/10; H02G 3/0412;
(Continued)

(56) References Cited

U.S. PATENT DOCUMENTS 2,743,946 A * 5/1956 Schmid .................... F16L 5/10
                                               285/123.1
3,542,405 A * 11/1970 Nalodka ................... F16L 5/10
                                               285/136.1
(Continued)

OTHER PUBLICATIONS

International Search Report and Written Opinion dated Dec. 8, 2016 in International Patent Application No. PCT/US2016/054616 (10 pages).

*Primary Examiner* — Kyle J. Walraed-Sullivan
(74) *Attorney, Agent, or Firm* — Fox Rothschild LLP; Robert J. Sacco

(57) ABSTRACT

A firestopping sleeve positionable usually in walls which is self-adjusting and includes a sleeve defining an access corridor extending longitudinally therewithin with at least one firestopping pad positioned therein. The sleeve has an access corridor extending therethrough for receiving wall penetrating cables which are firestopped therearound by the pad. A projecting block is attacked to the pad for providing self-adjusting and sealing capability of the device, to prevent air or smoke leaks around the cables.

11 Claims, 4 Drawing Sheets

(51) Int. Cl.
*A62C 3/16* (2006.01)
*E04B 1/94* (2006.01)

(58) Field of Classification Search
CPC ..... H02G 3/22; Y10T 24/1498; E04B 2/7411; E04B 2/6812; E04B 2/6801; E04B 2/947
USPC ........................................ 52/232, 317, 220.8
See application file for complete search history.

(56) References Cited

U.S. PATENT DOCUMENTS

| | | | | |
|---|---|---|---|---|
| 3,601,863 | A * | 8/1971 | Dorsey | B65D 63/16 24/16 PB |
| 3,656,771 | A * | 4/1972 | Stout | F16L 21/022 277/607 |
| 3,881,752 | A * | 5/1975 | Fujishima | F16L 5/10 174/151 |
| 4,136,707 | A * | 1/1979 | Gaillot | A62C 2/065 137/360 |
| 4,215,868 | A * | 8/1980 | Skinner | E03F 5/021 277/314 |
| 4,223,740 | A * | 9/1980 | Clayton | A62C 31/00 169/68 |
| 4,249,353 | A * | 2/1981 | Berry | F16L 5/04 52/232 |
| 4,918,761 | A * | 4/1990 | Harbeke | E03D 11/16 249/39 |
| 5,248,154 | A * | 9/1993 | Westhoff | F16L 5/10 277/606 |
| 5,953,872 | A * | 9/1999 | MacMillian | F16L 5/04 52/220.8 |
| 6,278,061 | B1 * | 8/2001 | Daoud | H02G 3/22 16/2.1 |
| 6,523,229 | B2 * | 2/2003 | Severson | B65D 63/1018 24/16 PB |
| 6,550,819 | B2 * | 4/2003 | DeSanto, Sr. | F16L 5/00 285/192 |
| 6,632,999 | B2 * | 10/2003 | Sempliner | E04F 15/02405 160/19 |
| 6,718,100 | B2 * | 4/2004 | Morris | F16L 9/19 138/111 |
| 6,732,481 | B2 * | 5/2004 | Stahl, Sr. | A62C 2/065 52/220.1 |
| 6,862,852 | B1 * | 3/2005 | Beele | A62C 2/065 137/67 |
| 7,373,761 | B2 | 5/2008 | Stahl, Sr. | |
| 7,523,590 | B2 | 4/2009 | Stahl, Sr. | |
| 8,001,737 | B1 * | 8/2011 | Price | F16L 5/10 248/346.5 |
| 8,342,535 | B2 * | 1/2013 | Lattime | F16C 33/7813 277/412 |
| 8,689,504 | B2 * | 4/2014 | Monden | F16L 5/04 52/220.8 |
| 8,739,482 | B1 * | 6/2014 | Feil, III | A62C 2/065 52/220.8 |
| 8,887,458 | B2 | 11/2014 | Lopes | |
| 9,291,272 | B2 * | 3/2016 | Lattime | F16J 15/3256 |
| 2002/0007535 | A1 * | 1/2002 | Koppang | B65H 75/36 24/129 R |
| 2004/0016193 | A1 * | 1/2004 | Stahl, Sr. | A62C 2/065 52/317 |
| 2004/0140118 | A1 * | 7/2004 | Nishimoto | B60R 16/0222 174/650 |
| 2004/0208704 | A1 * | 10/2004 | Suyama | E03F 5/021 405/53 |
| 2005/0150677 | A1 * | 7/2005 | Hochstim | F16L 5/04 174/661 |
| 2006/0082137 | A1 * | 4/2006 | Muenzenberger | F16L 5/04 285/124.5 |
| 2006/0096207 | A1 * | 5/2006 | Spais | F16L 5/04 52/317 |
| 2006/0138251 | A1 * | 6/2006 | Stahl, Sr. | A62C 2/065 239/309 |
| 2007/0125018 | A1 * | 6/2007 | Stahl, Sr. | A62C 2/065 52/232 |
| 2007/0137876 | A1 * | 6/2007 | Miettinen | H02G 3/0481 174/50.56 |
| 2008/0128998 | A1 * | 6/2008 | Klein | F16L 5/04 277/604 |
| 2009/0084580 | A1 * | 4/2009 | Sempliner | H02G 3/185 174/153 G |
| 2010/0294519 | A1 * | 11/2010 | Beele | A62C 2/065 169/45 |
| 2011/0018210 | A1 * | 1/2011 | Beele | F16L 5/10 277/606 |
| 2011/0088917 | A1 * | 4/2011 | Lee | A62C 2/06 169/45 |
| 2011/0094759 | A1 * | 4/2011 | Lopes | A62C 3/16 169/48 |
| 2011/0173906 | A1 * | 7/2011 | Reddicliffe | E04F 15/02405 52/220.8 |
| 2011/0308179 | A1 * | 12/2011 | Pirner | E04B 9/003 52/220.6 |
| 2012/0097405 | A1 * | 4/2012 | Cordts | A62C 2/06 169/45 |
| 2012/0233943 | A1 * | 9/2012 | Monden | F16L 5/04 52/220.1 |
| 2012/0297709 | A1 * | 11/2012 | Hilburn | E04B 1/948 52/232 |
| 2014/0068896 | A1 * | 3/2014 | Cheng | F16L 3/233 24/16 PB |
| 2014/0260016 | A1 * | 9/2014 | Langille | F16L 5/04 52/232 |
| 2015/0121658 | A1 * | 5/2015 | Kamigaichi | B60R 16/0215 24/16 PB |
| 2015/0130140 | A1 * | 5/2015 | Faller | F27D 99/0073 277/314 |
| 2015/0165986 | A1 * | 6/2015 | Morris | B60R 16/0215 280/728.2 |
| 2016/0201319 | A1 * | 7/2016 | Pilz | E04B 1/944 52/232 |
| 2016/0273682 | A1 * | 9/2016 | Paetow | H02G 3/22 |
| 2017/0232281 | A1 * | 8/2017 | Rakic | A62C 2/065 169/43 |

* cited by examiner

SELF-ADJUSTING FIRESTOPPING SLEEVE APPARATUS

CROSS-REFERENCE TO RELATED APPLICATIONS

This patent document claims priority to U.S. Provisional Patent Application No. 62/234,978 filed Sep. 30, 2016, the disclosure of which is incorporated herein by reference in full.

FIELD OF THE INVENTION

This disclosure relates to the field of firestopping appliances and particularly a sleeve positionable within an aperture of a construction barrier for firestop sealing around penetrating members which would otherwise be required to extend through the wall area.

BACKGROUND OF THE INVENTION

Normally a firestopping sleeve includes an outer shell positionable inside an aperture in a construction wall, where the outer shell has an opening extending longitudinally therethrough that allows cables to go through and seal around the cables. The firestopping sleeve has been discussed in some patents. However, existing firestopping appliances often have the drawbacks of leaking air or smoke around the cables, for which a manual adjustment is required during installation to achieve a complete sealing. Other existing firestopping appliances use foams at each end of the sleeve, however, extending a cable through both ends of the sleeve can require skills and manual adjustment by human, adding labor and time to the installation. Other existing appliances use templates having a fixed number of holes around the cable, which also have similar drawbacks. Some of these existing systems are discussed in more detail below.

The U.S. Pat. Publication No. 2008/0128998 "Leadthrough and a sealing element for the leadthrough" discloses a sleeve with a tubular body and a secure element at the end of the tubular body. However, the secure element is rigid, and it cannot properly seal air tightly around the cables.

The U.S. Pat. Nos. 7,523,590 and 7,373,761, both to Stahl, disclose an improved firestopping sleeve insert that includes two moveable pads that are configured to allow cables to extend therebetween and seal around the cables by moving close together. Specifically, the U.S. Pat. No. 7,523,590 discloses a moving mechanism that is configured to move the two moveable pads inwardly together; and the U.S. Pat. No. 7,373,761 discloses using a set of springs between each moveable pad and the outer shell of the sleeve to push the pads inwardly together. These teachings, however, either require manual adjusting of the position of the moveable pads after the cables are installed, or increase the cost of the sleeve in the moving mechanism.

The U.S. Pat. No. 8,887,458 to Lopes discloses a self-adjusting firestopping sleeve with flexibly resilient pads positioned opposing to each other and seal the cables extending there between. However, the resilient pads may not easily conform to various types of cables, shapes, dimensions and arrangements.

This document describes a system that may address at least some of the issues described above and/or other issues.

SUMMARY OF THE INVENTION

In a preferred embodiment, a self-adjusting firestopping sleeve apparatus includes an outer shell forming an access corridor there within, two firestopping pads inside the outer shell, each having a curved section in the middle and positioned opposing to each other. The curved section has a convex surface. Each firestopping pad has a projecting block attached to the convex surface. The projecting block has a contact surface spaced from the convex surface of the corresponding firestopping pad. The first and second firestopping pads are configured to be positioned inside the access corridor with the first convex surface and the second convex surface facing opposite one another such that the first and second contact surfaces are in contact to form a sealing abutment seam. At least one of the first and the second projecting blocks has a trapezoidal shape.

Each projecting block is attached to the corresponding firestopping pad at the convex surface thereof by a tape. The tape covers at least a portion of the contact surface of the projecting block and a portion of the corresponding convex surface to secure the projecting block to the corresponding firestopping pad.

The sleeve apparatus further includes one or two arrays of bristles each disposed in the access corridor proximate to an opening of the outer shell. Each array of bristles is positioned inside the access corridor at an angle with respect to the cross section of the access corridor, and covers at least a portion of the cross section of the access corridor. Two arrays of bristles may intersection each other to completely cover the entire cross-sectional area.

The apparatus further includes a constriction means for positioning the first and second firestopping pads into place within the access corridor. For example, the constriction means can be a banding means wrapping around both of the firestopping pads in a middle porton. The outer shell of the apparatus has a outer shell wall that has an adjustment opening slot aligning with the banding means, which extends to outside the access corridor through the adjustment opening slot and can be pulled outwardly to increase the amount of constriction.

In the second embodiment, the apparatus may not have an outer shell. Instead, the sleeve has two firestopping pads and two projecting blocks that are positioned in a similar configuration as that of the preferred embodiment.

DETAILED DESCRIPTION

This disclosure is not limited to the particular systems, methodologies or protocols described, as these may vary. The terminology used in this description is for the purpose of describing the particular versions or embodiments only, and is not intended to limit the scope.

As used in this document, any word in singular form, along with the singular forms "a," "an" and "the," include the plural reference unless the context clearly dictates otherwise. Unless defined otherwise, all technical and scientific terms used herein have the same meanings as commonly understood by one of ordinary skill in the art. All publications mentioned in this document are incorporated by reference. Nothing in this document is to be construed as an admission that the embodiments described in this document are not entitled to antedate such disclosure by virtue of prior invention. As used herein, the term "comprising" means "including, but not limited to."

Figure 1:
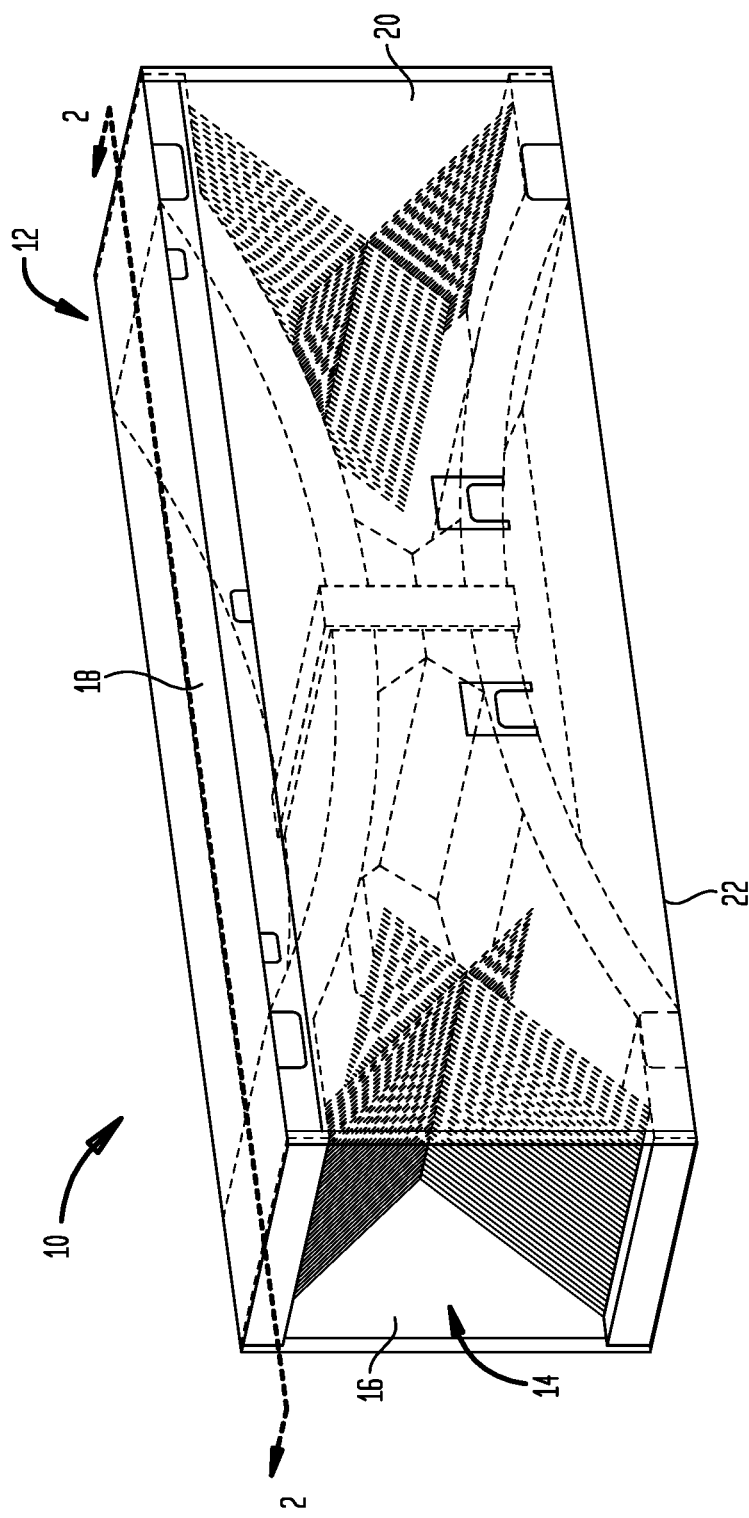
FIG. 1 is a perspective view of a firestopping sleeve according to an embodiment with the outer shell of the firestopping sleeve shown partially transparently for viewing of the internal components.
Figure 2:
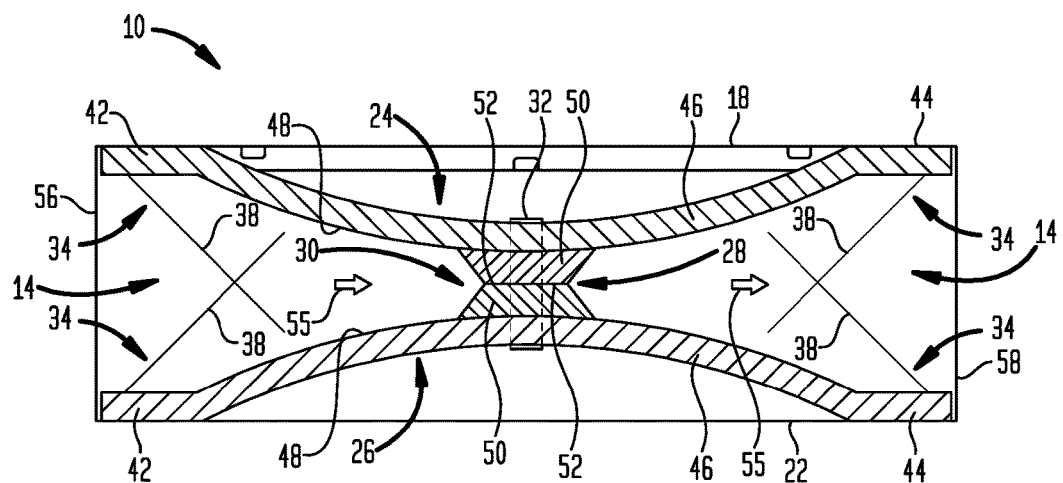
FIG. 2 is a cross-sectional view along the line 2-2 of FIG. 1.

FIGS. 1 and 2 show a preferred embodiment, in which a firestopping sleeve 10 includes an outer shell 12. The outer shell can have various configurations, for example, rectangular or cylindrical. A construction barrier such as a wall, floor or ceiling may have an aperture therein for allowing penetrating members, such as wires or cables or other similar penetrating members to pass through for various purposes. The firestopping sleeve 10 is installable in the aperture of the construction barrier for sealing around the wires or cables penetrating through the aperture. The sleeve 10 has two opposing openings 56, 58 and an access corridor 14 that extends completely longitudinally through the outer shell 12 of the sleeve, between the two opposing openings. The outer shell 12 includes a number of interior sleeve walls, such as 16, 18, 20 and 22, which define the outermost boundaries of the access corridor 14.

FIG. 2 shows the side cross-sectional view of the firestopping sleeve, in which two firestopping pads 24, 26 extend in the access corridor inwardly to generally seal the corridor. In the preferred embodiment, the firestopping pads 24, 26 have the same configuration and are made of foams. It is understood that the pads 24, 26 may have slight variations from one another. The pads are placed opposing each other and together fitted within the access corridor 14. The pads are in contact with each respective interior sleeve wall 18, 22 of the sleeve outer shell and secured onto the interior sleeve wall via clips or the like.

Figure 3:
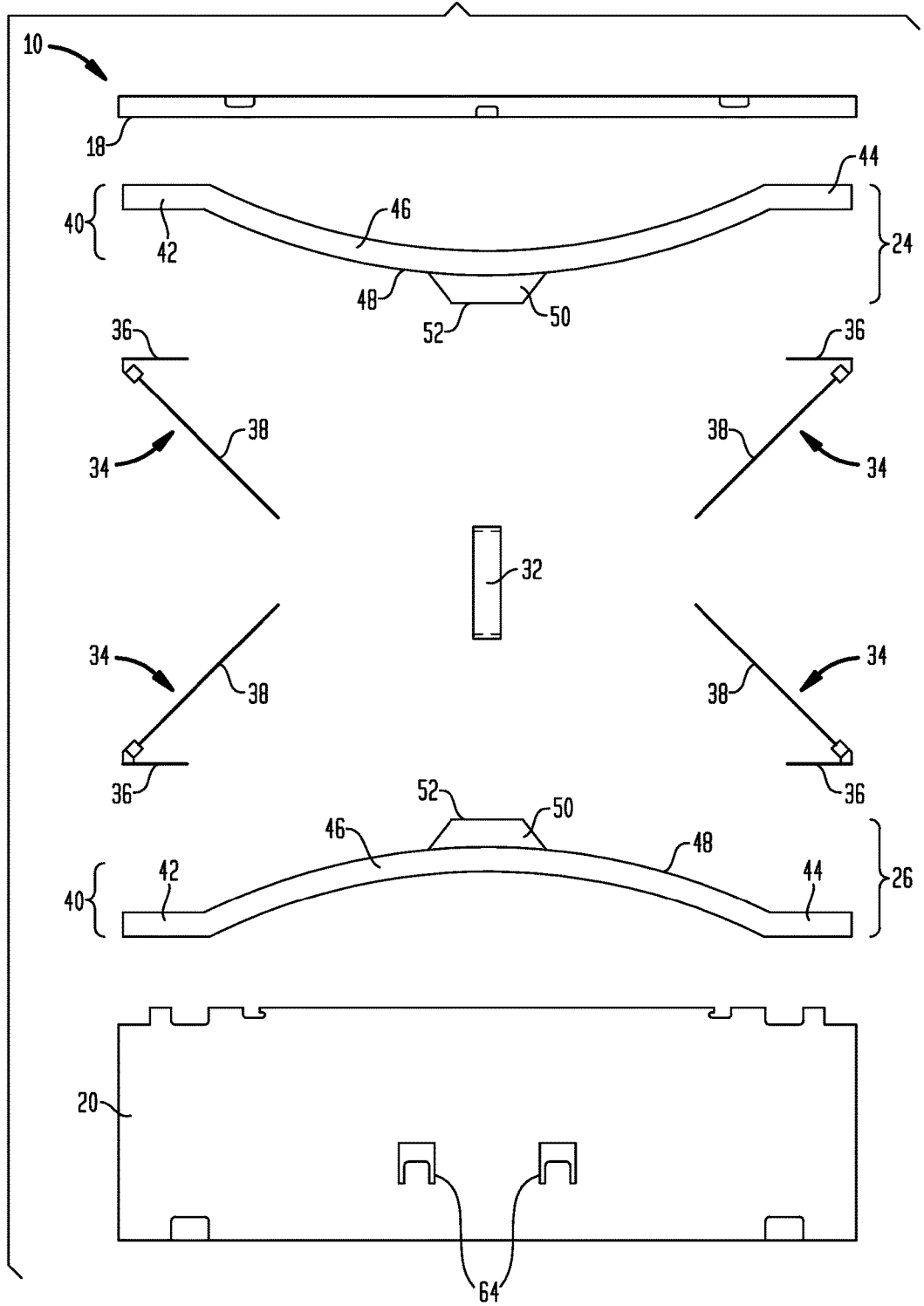
FIG. 3 is an exploded elevation view of the firestopping sleeve of FIG. 1.

In detailed illustrations of the firestopping sleeve, FIG. 3 shows that each of the firestopping pads 24, 26 includes a body 40, which has two opposing connection ends 42, 44 and a curved portion 46 in the middle of the pad extending between the opposing connection ends. The connection ends 42, 44 of the curved pads preferably lie in a common plane, which is in contact with a respective interior sleeve wall 18, 22 (FIG. 2). The curved portion 46 has a convex surface 48 which faces opposite the convex surface of the opposing pad. A projecting block 50 is attached to each curved firestopping pad at the apex of the convex surface 48 of each pad. In the illustrated embodiment, the projecting block 50 has a trapezoidal configuration, but it may have other configurations, for example, rectangular, square, oval, circular and the like. The projecting block 50 has a contact surface 52 which extends in a plane spaced from the convex surface 48. As will be described hereinafter, the contact surfaces 52 of the opposing pads 24, 26 provide significant sealing engagement with cables or the like extending through the access corridor 14 (FIG. 2).

Figure 4:
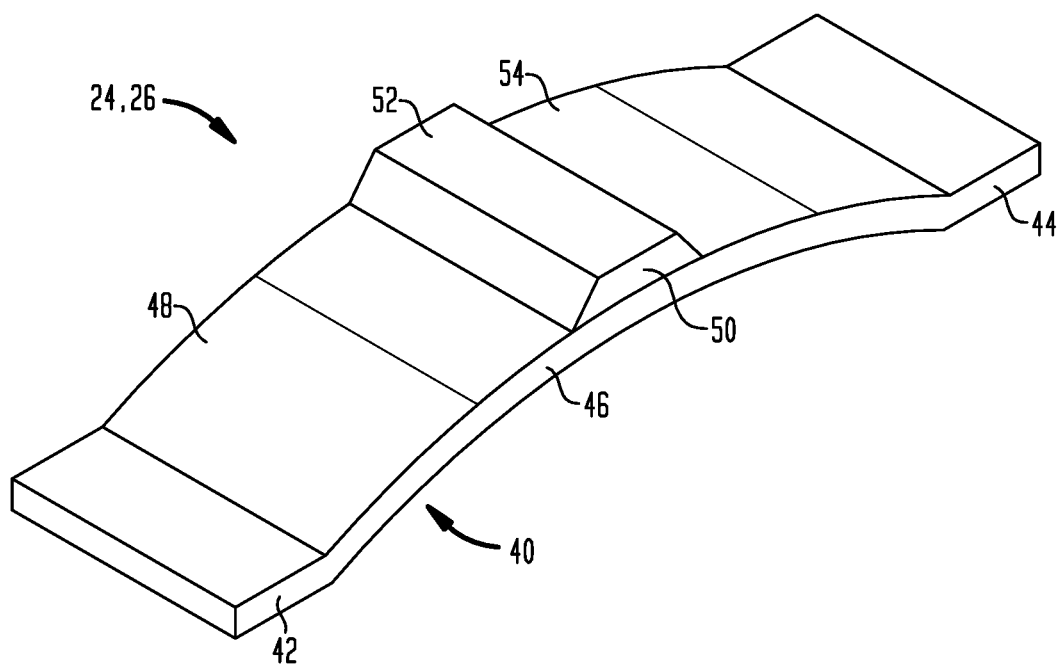
FIG. 4 is an isometric view of an exemplary foam pad with an inwardly extending block.

FIG. 4 shows a configuration of the firestopping pads and projecting block of the firestopping sleeve. The projecting block 50 is formed as a separate component from the curved firestopping pads 24, 26 and is secured onto the body 40 via a tape 54 applied over the block 50 and a portion of the convex surface 48. Other means may be utilized for attaching the projecting block 50 to the firestopping foams, e.g. adhesives, bonding, welding and the like, or the projecting block 50 may be formed integrally with the body 40.

Returning to FIG. 2, the first firestopping pad 24 is positioned within the upper area of the access corridor 14 and the second firestopping pad 26 is positioned within the lower section of the access corridor 14. In this manner, the first and second firestopping pad 24, 26 are positioned opposing to one another and configured so that the contact surface 52 of each projecting block 50 is into abutment with respect to one another along a pad abutment seam 28 defined between the two projecting blocks.

Figure 5:
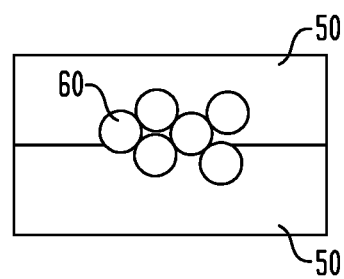
FIG. 5 illustrates a portion of a side cross-sectional view of the firestopping sleeve of FIG. 1.

The projecting blocks 50 and the first and second firestopping pads also define a confinement area 30 for receiving cables extending longitudinally therethrough. This confinement area 30 at the abutment seam 28 provides the location for placement of cables extending through the sleeve 10 while also maintaining firestopping therearound. For example, the cables may be extended through the access corridor 14 in the direction 55 and through the confinement area 30 and abutment seam 28. FIG. 5 is a side cross-sectional view of the sleeve that shows the projecting blocks 50, multiple cables 60 in a bundle are extended through the abutment seam between the projecting blocks 50, where the projecting blocks are capable of conforming to the various configurations of the cables to form a seal around them.

It should be appreciated that both of the two firestopping pads 24 and 26 need not be arched. Only one of these pads needs to be arched or otherwise urged toward the other pad in order to form the confinement area 30 and create a compression force such that the two pads are capable of self-sealing against a penetrating member. For example, in FIG. 2, the pads 24, 26 and the block 50 can be configured to create an adequate compression force for accommodating a self-adjusting sealing of a required number of cables, such as 0-5 cables that can extending through the abutment seam 28. This feature will be further described in detail below.

The firestopping pads and the projecting blocks can made be of any commonly available material which includes a firestopping component and a magnitude of inherent flexible resilience. The flexible resilience of the pads themselves provides some amount of force for exerting the force needed for firestopping sealing about cables passing through the confinement area 30 defined between the two firestopping pads.

There is a limited amount of inherent flexible resilience in the arched configuration of the firestopping pads 24 and 26 since they are usually formed of a flexibly resilient foam material and often include an intumescent component therewithin. This allows the firestopping pads to swell and push closer to each other in the present of heat exposure as a result of fire. In order to ease the insertion of cables, optionally, the surfaces of firestopping pads that form the confinement area 30 are coated a special low friction coating or film, such as polyethylene, or the surface may be coated with a lubricant, such as a talc or a silicone gel, which makes the surfaces around the confinement area slippery, reducing the frictions that may be caused by inserting the cables.

The projecting blocks 50 are also made of flexibly resilient foam material which may also include an intumescent component therewithin. Thus, the project blocks will swell as a result of heat exposure, helping to seal the space around the cables more in the presence of fire. The size of the projecting blocks 50 and the softness/hardness of the foam material can vary depending on the applications, in which the types of cables, the expected number of cables (in a bundle), the arrange of cables (e.g. multiples in parallel or in a bundle), and/or the size of the cables. For example, the types of cables may include copper conductor telecommunication cable (e.g. No. 24 AWG), copper conductor power cable, copper conductor control cable, metal clad or armored cable, NM cable, copper conductor data cable optical fiber cable, and/or coaxial cable. A bundle of cables may have a combination of any of the above listed cables or other cables. In an example, in a typical application, the projecting block 50 can have a thickness of 0.3-0.5 inches, a length (to accommodate the lateral width of the access corridor) of 3.5-4.0 inches, and a width of 1.0-3.0 inches. The size of the projecting block may be in other ranges too.

To further describe the preferred embodiment, in FIG. 4, the projecting block 50 is attached onto the body 40 of the firestopping pads via a tape 54 applied over the block 50 and a portion of the convex surface 48. The tape 54 also serves to provide a slippery surface near the confinement area 30 as well as the abutment seam (in FIG. 2), thus ease the insertion of the cables without causing abrasion or damage to the cables. Alternatively, the projecting block 50 can be attached to the body 40 of the firestopping pads via an adhesive in between, and the projecting block 50 can be coated with a special coating, such as polyethylene or other types of coating, to ease the insertion of cables extending therebetween. The use of the tape or special coating will not affect the self-sealing capability of the projecting blocks.

The density of the projecting block 50 can vary depending on the materials and applications. For example, the density of the foam block can be in the range of 1 lb/cu ft to 6 lb/cu ft, such as 1 lb/cu ft, 2 lb/cu ft, or 3 lb/cu ft. Other ranges may also be possible.

Optionally, the illustrated sleeve 10 may provide a flexibly resilient supplemental constriction means 32, as shown in FIG. 2, to enhance the inherent flexible resilience of the firestopping pads 24 and 26. The constriction means can be a banding means, which extends and wraps around both opposed pads 24, 26, axially aligned with the projecting blocks 50 at the middle of the pads. This enhances abutting sealing contact of the contact surfaces 52 with respect to the cables passing therebetween for sealing around the cables.

In the preferred embodiment, the construction of the optional banding means 32 includes a single flexible resilient member preferably made of rubber or another elastic material which extends around the firestopping pads 24, 26 together in such a manner as to compress the projecting blocks 50 radially inwardly. When the sleeve is empty (without cables), the banding means helps to tie the projecting blocks altogether and close the seal abutment seam 28. When a penetrating member such as a cable or wire is positioned within the confinement area 30 located between the two firestopping pads along the pad abutment seam 28 defined therebetween, this constriction means helps to seal around the cables. The elasticity of the banding means shall be sufficient to to create enough compression force to close the abutment seam formed by the projecting blocks 50 when the sleeve is empty. It should also be flexible enough so that a cable or a bundle of cable can be inserted without excessive friction.

The outer banding means 32 can also possibly include an adjustment capability. This adjustment capability can be provided by various means depending upon the specific construction. For example, banding means 32 can be manufactured with various different magnitudes of flexible resilience or be of various sizes to provide an adjustability feature in the total magnitude of flexibly resilient supplemental constriction when initially installed.

Alternatively, the band 32 can have an adjustment portion or section (not shown) which extends outwardly through an adjustment opening slot defined in the outer shell 12 of sleeve 10, such as side outer shell wall 20 (FIG. 1). The band 32 can be pulled outwardly by installation personnel to increase the amount of constriction. The amount of constriction can be reduced by a user merely by reaching within the sleeve 10 and expanding the pad slightly to pull the adjustment section to a less extended position. Various banding means 32 are described in U.S. Pat. No. 8,887,458, the contents of which are incorporated herein by reference.

It is important to appreciate that all of the features of the preferred embodiment provide for a very gentle means of forcibly enhancing the contact between the firestopping pads 24, 26, and the blocks 50 thereof, and the penetrating cables extending through confinement area 30 within sleeve 10. The various configurations disclosed herein each gently urge the firestopping sealing pad and/or projecting blocks 50 into contact with the external surface of the penetrating cable without creating any abrasion or scraping thereagainst. The abrasion or scraping of cables by internal components of a firestopping sleeve has been a problem since such laterally exerted forces can sometimes damage the cables extending therethrough or the outer insulation therearound. The preferred embodiment is configured specifically for minimizing any such lateral abrasion or friction against the cables because the firestopping pad is gently constricted thereagainst.

Furthermore, the construction of the preferred embodiment provides a self-adjusting firestop sleeve which self-adjust, gently and effectively form the abutting contact to seal around the cables due to the flexible resilience of the pads 24, 26 themselves, the projecting blocks 50 and the flexibly resilient supplemental constriction means 32.

Optionally, as shown in FIG. 2, the sleeve 10 also incorporates a pair of brush seals 34 at each end of the corridor 14. Each of the brush seals 34 is configured to cover at least a portion of the cross section of the access corridor to keep out dust and particulates. Each brush seal 34 includes a connection bracket 36 supporting a plurality of bristles 38 in a brush formation. Each pair of brush seals may contain two opposing seals 34, each attached to an opposing outer shell wall and configured to intersect with one another to completely cover the cross section of the access corridor and keep out dust and particulates from entering into the access corridor 14. The brush seals additionally enhance the self-adjusting capability of the sleeve 10 to provide sealing against dust and particulates for penetrating members, such as cables and wires, of various quantities and sizes. Because bristles are not rigid, they allow the external surface of the penetrating cable to extend through the sleeve without creating any abrasion or scraping thereagainst.

The outer shell 12 of the firestopping sleeve, as shown in FIG. 1, can be a rectangular box made of steel, e.g. long galvanized steel, or plastic or the like, and installable in an aperture of a construction barrier, e.g. a construction wall, and to be in contact with or attached to the inner surface of the aperture. The firestopping sleeve can be made in various sizes to suit different applications in the construction. For example, the firestopping sleeve can be installed in between studs, or gypsum board. In another example, the outer shell can have a dimension of 4 by 4 by 12 inches, or 4 by 5 by 14 inches, or 5 by 5 by 14 inches, or the like.

The firestopping sleeve can be secured in place by means of steel wall plates installed with gasketing material. For example, the steel wall plates can be installed on both sides of the inner surface of the aperture of the construction barrier and secured to each firestopping sleeve by means of steel screws. In another example, each side outer shell wall of the outer shell 12 can have a bracket or socket 64 (in FIG. 3) that can be coupled to a mounting socket/bracket secured on the inner surface of the aperture. Alternatively, the bracket or socket 64 can be coupled to the bracket or socket of another sleeve so that multiple firestopping sleeves are secured together and placed in the aperture of the construction barrier.

Optionally, the firestopping sleeve apparatus can have fewer number of walls for the sleeve outer shell. For example, the sleeve may only need to have top and bottom outer shell wall 18, 22, having a frame therebetween to support the structure of the sleeve.

In a second embodiment, the sleeve may not require an outer shell. For example, FIG. 2 shows similar structure of the second embodiment, except that there is no outer shell or outer shell wall. In the second embodiment, the opposing firestopping pads 24, 26 and the constriction means 32 may be configured to form a sleeve that is positionable in an aperture of a construction barrier for a penetrating member, such as cables or wires, to extend therethrough. The sleeve includes a pair of firestopping pad 24, 26, each having a convex surface 48, and a projecting block 50 attaching to the convex surface 48. The projecting block 50 has a contact surface 52 which is spaced from the surface 48. The two firestopping pads 24, 26 in the pair are configured to be positioned towards one another such that the contact surface 52 of each projecting block 50 contacts one another to form a sealing abutment seam 28. The sleeve also includes a constriction means for positioning the two firestopping pads 24, 26 into place. In one configuration, the constriction means is a band made of rubber and wrapped around the firestopping pads 24, 26. The constriction means may be constructed in a similar manner as in the preferred embodiment.

The first or second embodiment of the firestopping sleeve described above with reference to FIGS. 1-4 can be used to install a penetrating member, such as cables or wires, through an aperture of a construction barrier. As would be appreciated by a person ordinarily skilled in the art, any method may be used to extend the cables or wires through the firestopping sleeve. For example, one may extend a penetrating member, such as cables or wires, though an aperture of a construction barrier by placing the firestopping sleeve 10 within the aperture of the construction barrier, longitudinally along a central axis of the aperture. The construction barrier may be a construction wall, floor, a ceiling surface or the like. One may further extend the penetrating member from outside the sleeve to inside the access corridor through a first opening 56 of the outer shell 10, extend the penetrating member through the access corridor 14 of the sleeve so that the penetrating member reaches the confinement area 30 formed by the opposing projecting blocks 50, continue extending the penetrating member through the sealing abutment seam formed by the projecting blocks 50; and extend the penetrating member through the access corridor 14 to outside the sleeve via the second opening 58. After the penetrating member extends through the sleeve 10, the projecting blocks 50 will self-seal around the penetrating member.

Other methods may include using a snake or fish wire or a pilot cable to extend through the firestopping sleeve, then pulling the snake or fish wire out to pull the cables or wires through the sleeve. If the firestopping sleeve has bursh seals installed proximate to an opening, such as shown in FIG. 2, one may first extend the penetrating member through the brush seals 34 in order to extend the penetrating member to inside the access corridor 14.

The various embodiments disclosed in this patent document provide advantages over the prior art, whether stand-alone or combined. Particularly, both the firestopping pads and the projecting blocks provide sealing functions to reduce airflow through the device and thus improve the ability to block particulate air and smoke. These various embodiments are advantageous in providing self-adjusting sealing capability to conform to various types of cables and arrangements. Because cables may be shifted from the center position in the access corridor of the firestopping sleeve, the embodiments disclosed here also provide advantages in self-conforming to the cables regardless when they are located in between the projecting blocks.

A test was constructed for the firestopping sleeve that accommodates different types of cables and different arrangement of cables therein. For a wide range of percentage (0-100%) of visual fill within the access corridor (or loading area), the F and T ratings as defined in UL 1479 or ASTM E 814 are in the range of 1 to 4 hours depending on the type of floor or wall assembly or types of cables. The L-ratings, as defined in UL 1479, are also measured. The ambient L-rating (simulating code smoke) and the elevated L-rating at 400 F (simulating hot smoke) can consistently be maintained at around 1.5-2.5 CFM across the entire range of visual fill, lower than L-ratings of most common penetrants, e.g. 4×4 outlet boxes with switches or receptacles, which are measured to be around 5 CFM.

These and other advantages of the present invention be apparent to those skilled in the art from the foregoing specification. Accordingly, it be recognized by those skilled in the art that changes or modifications may be made to the above-described embodiments without departing from the broad inventive concepts of the invention. It should therefore be understood that this invention is not limited to the particular embodiments described herein, but is intended to include all changes and modifications that are within the scope and spirit of the invention as defined in the claims.

What is claimed is:

1. A self-adjusting firestopping sleeve apparatus positionable through an aperture in a construction barrier for a penetrating member to extend therethrough, comprising:
    a first firestopping pad comprised of a first pad resilient foam including a pad intumescent component, the first firestopping pad having a first convex surface;
    a first projecting block comprised of a first block resilient foam including a block intumescent component and attached to the first convex surface of the first firestopping pad, the first projecting block has a first contact surface spaced from the first convex surface of the first firestopping pad;
    a second firestopping pad comprised of a second pad resilient foam including the pad intumescent component, the first firestopping pad having a second convex surface;
    a second projecting block comprised of a second block resilient foam including the block intumescent component and attached to the second convex surface of the second firestopping pad, the second projecting block has a second contact surface spaced from the second convex surface of the second firestopping pad;
    the first and second firestopping pads are configured to be positioned with the first convex surface and the second convex surface facing opposite one another such that the first and second contact surfaces are in contact to form a sealing abutment seam;
    wherein the first and second projecting blocks are configured to facilitate compression and sealing at the sealing abutment seam.

2. The apparatus of claim 1, further comprising:
    an outer shell having a first and a second opening and an access corridor between the first and second openings, wherein the first and second firestopping pads, and the first and second projecting blocks are located within the access corridor.

3. The apparatus of claim 2, wherein:
the outer shell has at least two opposing walls;
the first firestopping pad has a first and second ending portion, wherein the first and second ending portions both lie in a first common plane;
the second firestopping pad has a third and fourth ending portion, wherein the third and fourth ending portions both lie in a second common plane;
the first and second ending portions are in contact with one of the two opposing walls of the outer shell, and the third and fourth ending portions are in contact with the other of the two opposing walls.

4. The apparatus of claim 3, wherein at least one of the first and the second projecting blocks has a trapezoidal shape.

5. The apparatus of claim 4, wherein:
the first projecting block is attached to the first convex surface by a tape that covers at least a portion of the first contact surface and a portion of the first convex surface to secure the first projecting block to the first firestopping pad; and,
the second projecting block is attached to the second convex surface by a tape that covers at least a portion of the second contact surface and a portion of the second convex surface to secure the second projecting block to the second firestopping pad.

6. The apparatus of claim 5 further comprising a first array of bristles disposed in the access corridor proximate to the first opening of the sleeve outer shell and at an angle with respect to the cross section of the access corridor, wherein the first array of bristles covers at least a portion of the cross section of the access corridor.

7. The apparatus of claim 6 further comprising:
a second array of bristles disposed in the access corridor proximate to the first opening of the sleeve outer shell and at an angle with respect to the cross section of the access corridor, wherein the second array of bristles cover at least a portion of the cross section of the access corridor,
wherein the second array of bristles intersect with the first array of bristles so that the first and second array of bristles cover the entire cross section of the access corridor.

8. The apparatus of claim 7, wherein the first and second firestopping pads are coated with polyethylene.

9. The apparatus of claim 8 further comprising a flexible resilient band which is configured to urge the first projecting block into contact with the second projecting block at the sealing abutment seam.

10. The apparatus of claim 9, wherein the flexible resilient band extends around the first and second firestopping pads in a middle portion.

11. The apparatus of claim 10, wherein a portion of the flexible resilient band extends outside the access corridor and is responsive to being pulled outwardly and away from the access corridor to constrict the first and second firestopping pads.

* * * * *